Patented July 25, 1939

2,167,067

UNITED STATES PATENT OFFICE 2,167,067

CHEMICAL PROCESS

Ivan Gubelmann, Wilmington, Del., and Louis Spiegler, Woodbury, N. J., assignors to E. I. du Pont de Nemours & Company, Wilmington, Del., a corporation of Delaware No Drawing. Application September 17, 1937, Serial No. 164,324

4 Claims. (Cl. 260—683)

This invention relates to the production of olefins and more particularly it relates to the production of olefins by the partial hydrogenation of diene-ynes having the general formula

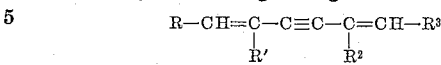

wherein R, R', R$^2$ and R$^3$ are hydrogen atoms or alkyl radicals having less than 6 carbon atoms, at least one of the R's being an alkyl radical.

It is known that unsaturated compounds may be reduced with hydrogen in the presence of a hydrogenation catalyst to increase the degree of saturation. For example, U. S. Patent No. 1,903,501, issued April 11, 1933, to Calcott, Carter and Downing, describes a process for carrying out the catalytic reduction of divinylacetylene with hydrogen.

The hydrogenation of highly unsaturated hydrocarbons may be considered as proceeding stepwise, one mol of H$_2$ being added, then a second mol of H$_2$, and so on until a completely saturated compound is obtained. The addition of the first mol of H$_2$ is not simultaneous throughout an entire charge of unsaturated hydrocarbon; and as soon as some of the first addition product is formed, the addition of the second mol of H$_2$ begins. Several addition reactions proceed simultaneously and at any time prior to complete hydrogenation a mixture of products exists. The prior art does not disclose the hydrogenation of diene-ynes of the general formula above stated in the presence of a nickel catalyst, nor does it disclose a method of controlling hydrogenation in the presence of said catalyst so as to selectively produce olefins in good yield.

It is an object of this invention to produce olefins in good yield by the partial catalytic reduction of diene-ynes of the general formula

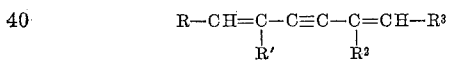

wherein R, R', R$^2$ and R$^3$ may be hydrogen atoms or alkyl radicals having less than 6 carbon atoms, at least one of the R's being an alkyl radical. Other objects will appear hereinafter.

These objects have been accomplished by reacting said diene-ynes having at least seven carbon atoms, in the liquid phase with hydrogen, in the presence of a catalyst which consists of active nickel, preferably on kieselguhr. With the type of catalyst employed and under the conditions herein described, the reduction proceeds easily until 3 mols of hydrogen are reacted per mol of diene-yne originally present, after which, little or no further reaction is observed, and it may be said that the reaction practically ceases. The products of the reduction are principally olefins. Only negligible quantities of intermediate products are isolated and there is practically no reduction to the completely saturated compounds. This may be explained by the fact that under the conditions herein disclosed, the addition of the second and third mols of H$_2$ occurs at such a high velocity that only small amounts of reduction products less saturated than olefins are isolated and the addition of the fourth mol of H$_2$ proceeds at such a low velocity that practically negligible amounts of saturated compounds are formed.

The following examples are given by way of specific illustration but the invention is not limited thereto.

Example I 79 parts of 2,5-dimethyl-divinylacetylene (2,5-dimethyl-1,5-hexadiene-3-yne), 70 parts of ethyl alcohol and 5 parts of reduced nickel carbonate on kieselguhr (30–40% nickel) are introduced in a steel shaker bomb connected to a hydrogen cylinder by means of a flexible steel tube. The bomb is heated to 90–100° C. while shaking vigorously, and the charge is saturated with hydrogen at 400–500 pounds per square inch until absorption is complete. The time required to complete the hydrogenation is 2 to 2½ hours. To obtain the desired olefin, the reduced mass is filtered from nickel and washed repeatedly with water to remove alcohol. Or, the mass can be steam distilled directly to yield about 78 parts (93% of theory) of reasonably pure 2,5-dimethyl-hexene. Redistillation through a short column (Vigreaux type) yields a pure olefin which is a clear colorless oil. This is a new chemical compound which has not previously been described in the literature and it has the following constants; boiling range 105.5°–106.5° C., specific gravity $$D_{20}^{20} = 0.690$$

index of refraction $$n_D^{30} = 1.3976$$

Iodine No. 225 (Theory=226). The new compound is thought to be 2,5-dimethyl-3-hexene

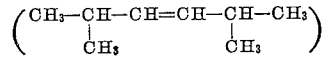

Example II 104 parts of 1,2,5,6-tetramethyl-divinylacetylene (3,6-dimethyl-2,6-octadiene-4-yne), 80 parts of ethyl alcohol and 8 parts of reduced nickel carbonate on kieselguhr are hydrogenated under pressure as described in Example I. There is obtained after reduction 3,6-dimethyl-octene, a mobile colorless liquid with a sweet geranium-like odor. This is a new compound which has not been previously described in the literature and has characteristics as follows: boiling range 155°–156° C., specific gravity $$D_{20}^{20} = 0.738$$

index of refraction $$n_D^{30} = 1.4213$$

The new compound is thought to be 3,6-dimethyl-4-octene

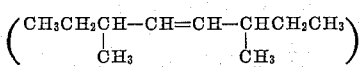

The diene-ynes suitable for this process are those having at least 7 carbon atoms and having the general formula

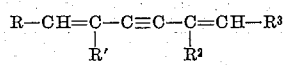

in which the R's may be hydrogen, methyl, ethyl, propyl, isopropyl or any one of the butyl or amyl radicals.

The catalyst for this reaction is active nickel, either unsupported or on a suitable support. For example, a satisfactory catalyst may be prepared by precipitating nickel hydroxide or nickel carbonate on kieselguhr and igniting in an atmosphere of hydrogen by well known methods. Such a catalyst contains from 30 to 40% nickel. The amount of catalyst used may be varied. When carrying the process out as a batch reaction, it is preferred that the weight ratio of catalyst to diene-yne be between 0.007 and 0.03 (the weight of the catalyst as herein expressed includes the metallic nickel only).

The reaction takes place over a temperature range of 40 to 100° C. when the pressure is between 400 to 500 pounds per square inch of hydrogen. It is preferred to carry out the reaction at a temperature of about 90° C.

While the preferred pressure range is from 400 to 500 pounds per square inch of hydrogen, the process is operative over a wider range of pressure, varying from 100 to 1500 pounds per square inch. It is apparent that when operating at a pressure outside of the preferred pressure range, the temperature should be adjusted accordingly.

The process may be carried on without agitation. Agitation accelerates the rate of reaction and hence it is preferred that an agitator be used. The speed of the agitator will vary with the type of apparatus used.

The process may be conducted as a continuous operation; for example, by feeding hydrogen, catalyst and diene-yne under pressure through a thermostatically controlled coil and continuously removing the product of the reaction from the system.

The process may be carried out in the absence or presence of a solvent. Suitable solvents are acetone, alcohol, ether, ethyl acetate, hexene-3, and hydrocarbons such as benzene, toluene and xylene.

The olefins produced by the process of the invention are very reactive and can be readily condensed with phenols or aromatic hydrocarbons to produce alkylated products which find application as dye intermediates, bactericides, gum inhibitors, rubber antioxidants and intermediates for the production of washing, wetting and emulsifying agents for textiles and rubber.

As has been stated, the specific olefins of the examples are new and valuable compounds.

Suitable changes may be made in the details of the process without departing from the spirit thereof and such changes are intended to be included within the scope of the appended claims.

We claim:

1. The process of preparing olefins which comprises reacting a diene-yne of the general formula

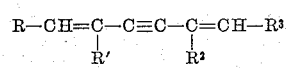

in which R, R', R² and R³ are hydrogen atoms or alkyl radicals having less than 6 carbon atoms and in which at least one of the R's is an alkyl radical, with an excess of hydrogen in the presence of a catalytic amount of active nickel until the reaction practically ceases.

2. The process of preparing olefins which comprises reacting a diene-yne of the general formula

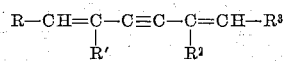

in which R, R', R² and R³ are hydrogen atoms or alkyl radicals having less than 6 carbon atoms and in which at least one of the R's is an alkyl radical, with hydrogen by agitating 100 parts by weight of the diene-yne and 0.7–3 parts by weight of a catalyst of active nickel on kieselguhr in an atmosphere of hydrogen until the reaction practically ceases and isolating the resulting olefin.

3. The process of preparing olefins which comprises reacting a diene-yne of the general formula

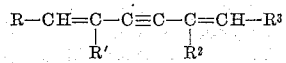

in which R, R', R² and R³ are hydrogen atoms or alkyl radicals having less than 6 carbon atoms and in which at least one of the R's is an alkyl radical, with hydrogen by agitating 100 parts by weight of the diene-yne and 0.7–3 parts by weight of a catalyst of active nickel on kieselguhr in an atmosphere of hydrogen under a pressure of 400 to 500 pounds per square inch at a temperature of 40° to 100° C. until the reaction practically ceases and isolating the resulting olefin.

4. As a new compound a 2,5-dimethyl-hexene having a boiling range of 105.5° to 106.5° C., a specific gravity of 0.69 and a refractive index of 1.398.

IVAN GUBELMANN.
LOUIS SPIEGLER.